UNITED STATES PATENT OFFICE.

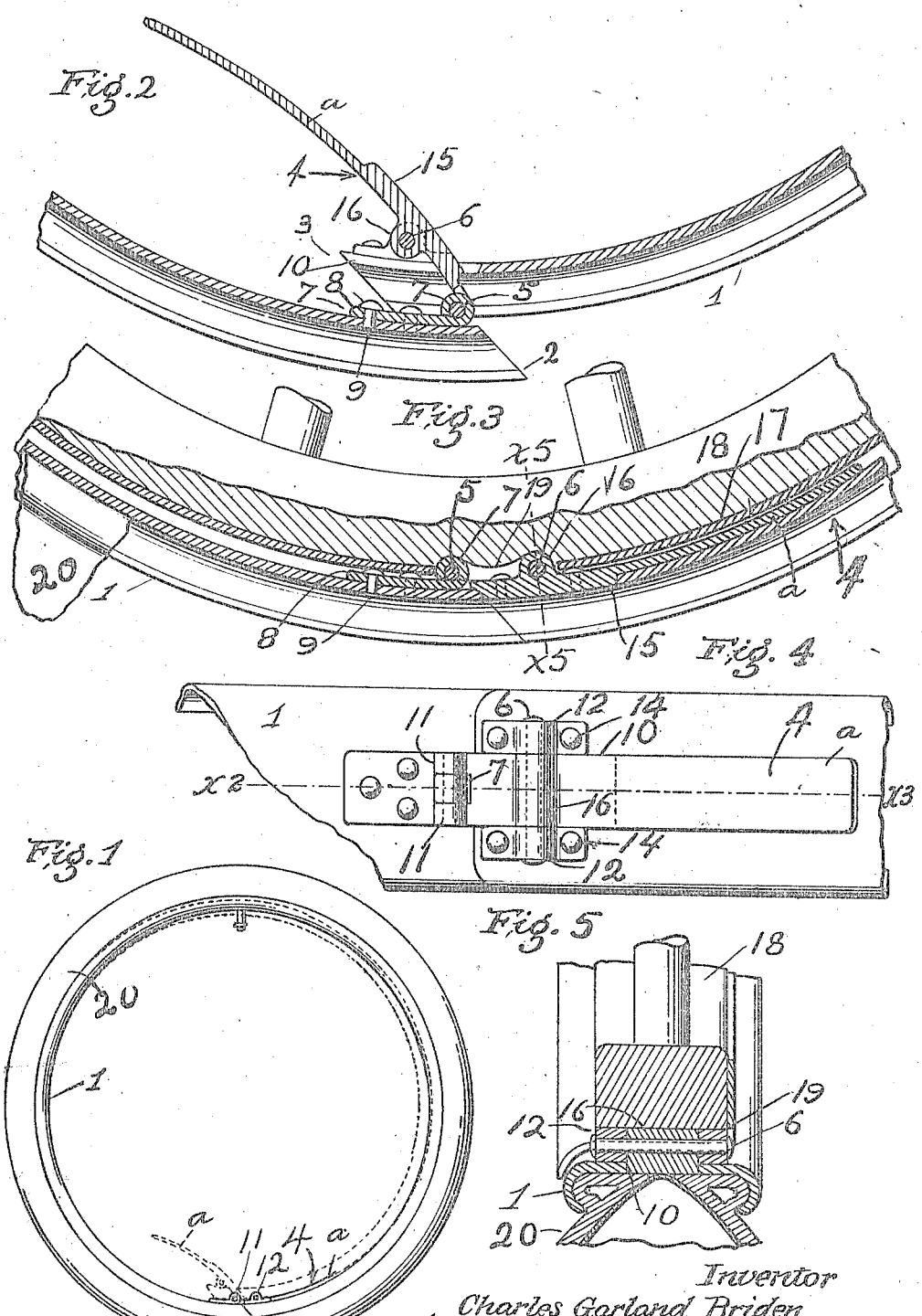

CHARLES GARLAND BRIDEN, OF LOS ANGELES, CALIFORNIA, ASSIGNOR OF ONE-HALF TO HOMER LAUGHLIN, JR., OF LOS ANGELES, CALIFORNIA.

DEMOUNTABLE TIRE RIM.

1,416,939.  Specification of Letters Patent.  Patented May 23, 1922.

Application filed October 1, 1918. Serial No. 256,613.

*To all whom it may concern:*

Be it known that I, CHARLES GARLAND BRIDEN, a citizen of the United States, residing at 1753½ North Vermont Avenue, in the city of Los Angeles, county of Los Angeles, and State of California, have invented a new and useful Improvement in Demountable Tire Rims, of which the following is a specification.

This invention relates to that class of demountable tire rims in which an open ring rim has its ends connected by a lever mounted on the inside of the ring and the invention relates more particularly to the construction and the combination of the lever and the open ring ends.

An object of the invention is to give greater strength and rigidity to the rim when expanded, and also to improve the lever in this respect.

Another object is to protect the tube or flap from destructive action of the rim.

Other objects, advantages and features of invention may appear in the accompanying drawing, the subjoined detail description and the appended claims.

The accompanying drawing illustrates the invention.

Fig. 1 is a side elevation of one of my improved tire rims on which a pneumatic tire is mounted. The tire rim is locked in its expanded position. Dotted lines indicate the position of the lever and rim when the tire rim is contracted for retracting the rim from the tire.

Fig. 2 is a large fragmental detail in section on line $x^2$—$x^3$ Fig. 4, being at the midplane of the tire rim when contracted.

Fig. 3 is a fragmental section in detail on the scale of Fig. 2 showing a fragment of a tire in place as when fastened to a wheel, a fragment of which is shown partly in section. Line $x^2$—$x^3$ Fig. 4 indicates the line of section.

Fig. 4 is a detached fragmental detail of the inner side of the demountable rim when locked as in Fig. 3.

Fig. 5 is a cross section on the line indicated by line $x^5$ Fig. 3.

The rim body 1, is a metal strip normally forming a circular ring as shown in solid lines in Fig. 1 and having oblique ends 2, 3, joined by a diagonal lap and connected by a toggle joint lever 4, fulcrumed to the inner side of the outer lap-end 2, by a pin 5 and to the inner side of the inner lap-end 3, by a pin 6.

The pin 5 is carried by an eye 7, on the inner face of a bearing strap 8, that is fixed by suitable means as the rivets 9, to the inner face of the outer lap-end 2. Said bearing edge and strap are accommodated in a slot 10, when the joint is closed, and is connected to the lever by eyes 11, formed at the end thereof.

The slot 10, extends along the inner lap-end, and the lever 4 extends therethrough when the demountable rim is contracted. The eyes 7 and 11, are adapted to pass through the end of the slot 10 in the operation of expanding and contracting the rim.

The pin 6 is supported by two bearings 12 on opposite sides of the slot at a distance from the inner lap-end 3, and the lever is reinforced by a bulge or boss 15 adapted to fit and close the slot when the demountable rim is expanded as in Fig. 3.

From the lever 4 and beyond the bulge or boss 15 extends a handle $a$, which conforms to the concavity of the inner side of the middle part of the rim while the outer side of the bulge or boss conforms to the convexity of the same part when the rim is expanded or closed. The bulge or boss 15 snugly fits in the opening bounded by the unslotted end 2 of the rim, the prongs or side walls of the slot 10 and the end wall thereof opposite to the unslotted end, so that, as the bulge or boss is tightly held in said opening by the resiliency of the rim, it prevents lateral displacement of the rim ends 2 and 3 and also counteracts longitudinal compression and displacement thereof, thus cooperating with the usual rim-securing means, not shown, in order to attain perfect alignment of the rim ends.

When the rim and the tire are mounted upon a wheel, as is fragmentally shown in Fig. 3, the boss is further held and securely locked into place by means of the lever handle $a$, which then rests against the felly-band 17 in a circumferential direction beyond the boss 15 or the opening in the rim.

In the lever shown, the terminal eyes 11 are formed in a bifurcation at one end of the thickened part of the lever, and the handle $a$ is formed at the other end of such thickened part while the intermediate pintle eye or seat 16 of the lever is formed opposite to the boss 15. The lever thus constructed forms an accessory that together with the parts 7 and 12, the pintles and the rivets may be used to transform a rim of the usual construction into the improved demountable rim disclosed.

The pin 6 is mounted in the eye 16, that projects from the inner face of the lever in conformity with the projections formed by the eyes 7, 11, and 12; and the felly band 17 and felly 18 of the wheel are recessed as at 19 to accommodate such inner projections. This prevents rim creeping.

In practice, to release the rim from the tire 20, the lever 4 will be thrown in as indicated in dotted line in Fig. 1 and in solid lines in Fig. 2. A reversed movement of the lever again tightens the rim in the tire, and it may thus be mounted on the wheel as indicated in Figs. 3 and 5.

By lapping the abutting or adjacent ends in which the ring terminates as shown, the closing of the lever brings the parts to a certain stop; but it is understood that the invention is not limited to lapping the ends although such construction is at present preferred.

Nor do I limit the construction to slotting only one of the ends; as various construction and modifications not necessary to be shown, will be understood by the constructor, it being provided that such construction and modifications be within the limit of my claims.

I claim:

1. The combination with a demountable tire rim in the form of an open ring having one end thereof slotted so that, when the rim is expanded, an opening is formed which is bounded by the unslotted end of the slot and the end wall opposite to the unslotted end, of a lever adapted to expand or to contract the rim and having on its outside a boss adapted to snugly fit said opening, said lever being pivotally seated adjacent to the unslotted end of the rim and also being pivotally seated opposite to said boss, so that, when the rim is expanded, the boss is tightly held in said opening and thus constitutes means that aids in preventing lateral and longitudinal displacement of the rim ends.

2. The combination with a demountable tire rim in the form of an open ring having one end thereof slotted so that, when the rim is expanded, an opening is formed which is bounded by the unslotted end of the rim,, the prongs on the sides of the slot and the end wall opposite to the unslotted end, of a lever adapted to expand or to contract the rim and having on its outside a boss adapted to snugly fit said opening; and a handle extending circumferentially from said lever beyond said boss and opening and conforming to the concavity of the inside of the rim when the rim is expanded, said lever being pivotally seated adjacent to the unslotted end of the rim and also being pivotally seated opposite to said boss, so that, when the rim is expanded, the boss is tightly held in said opening and thus constitutes means that aids in preventing lateral and longitudinal displacement of the rim ends.

3. The combination with a demountable tire rim in the form of an open ring having one end thereof slotted so that, when the rim is expanded an opening is formed which is bounded by the unslotted end of the rim, the prongs on the sides of the slot and the end wall opposite to the unslotted end, of a lever adapted to expand or to contract the rim and having on its outside a boss adapted to snugly fit said opening; and a handle extending circumferentially from said lever beyond said boss and opening and conforming to the concavity of the inside of the rim while the boss is with its outer face conforming to the convexity of the outer face of the rim when the rim is expanded, said lever being pivotally seated adjacent to the unslotted end of the rim and also being pivotally seated opposite to said boss, so that, when the rim is expanded, the boss is tightly held in said opening and thus constitutes means that aids in preventing lateral and longitudinal displacement of the rim ends and also means at the rim ends for preventing injury to the tire on said rim.

In testimony whereof, I have hereunto set my hand at Los Angeles California, this 12th day of September, 1918.

CHARLES GARLAND BRIDEN.

Witness:
JAMES R. TOWNSEND.